(12) United States Patent
Zuili

(10) Patent No.: US 7,481,363 B2
(45) Date of Patent: Jan. 27, 2009

(54) SMARTCARD AUTHENTICATION AND AUTHORIZATION UNIT ATTACHABLE TO A PDA, COMPUTER, CELL PHONE, OR THE LIKE

(75) Inventor: Patrick Zuili, Boca Raton, FL (US)

(73) Assignee: Brite Smart LLC, Wilmington, DE (US)

( * ) Notice: Subject to any disclaimer, the term of this patent is extended or adjusted under 35 U.S.C. 154(b) by 0 days.

(21) Appl. No.: 10/747,972

(22) Filed: Dec. 30, 2003

(65) Prior Publication Data

US 2004/0149827 A1   Aug. 5, 2004

Related U.S. Application Data

(63) Continuation-in-part of application No. 10/215,888, filed on Aug. 9, 2002, now Pat. No. 7,083,090.

(51) Int. Cl.
*G06K 5/00* (2006.01)

(52) U.S. Cl. .................. 235/380; 235/382; 235/454; 235/472.01

(58) Field of Classification Search ................. 235/380, 235/472.01–472.03, 492, 454, 379, 382, 235/462.45; 705/50
See application file for complete search history.

(56) References Cited

U.S. PATENT DOCUMENTS

| | | | | |
|---|---|---|---|---|
| 4,386,266 A | | 5/1983 | Chesarek | 705/72 |
| 4,993,068 A | * | 2/1991 | Piosenka et al. | 713/186 |
| 5,221,838 A | | 6/1993 | Gutman et al. | 235/379 |
| 5,440,109 A | | 8/1995 | Hering et al. | 235/384 |
| 5,465,386 A | | 11/1995 | Barnes et al. | 455/15 |
| 5,489,773 A | | 2/1996 | Kumar | 235/380 |
| 5,578,808 A | | 11/1996 | Taylor | 235/380 |
| 5,583,933 A | | 12/1996 | Mark | 379/355 |
| 5,661,517 A | | 8/1997 | Budow et al. | 725/60 |
| 5,732,133 A | | 3/1998 | Mark | 379/355 |
| 5,734,975 A | | 3/1998 | Zele et al. | 455/307 |
| 5,745,555 A | | 4/1998 | Mark | 379/95 |
| 5,768,382 A | * | 6/1998 | Schneier et al. | 380/251 |
| 5,774,546 A | | 6/1998 | Handelman et al. | 380/227 |
| 5,802,199 A | | 9/1998 | Pare et al. | 382/115 |
| 5,818,930 A | | 10/1998 | Mark | 379/444 |

(Continued)

Primary Examiner—Seung H Lee

(57) ABSTRACT

An autonomous and portable smartcard reader device incorporates a high level of embedded security countermeasures. Data transfers are encrypted with two specific input devices, namely a light sensor and PIN or other keyboard entry, and at the output through the use of a dual-tone encoder-decoder. The unit may be used alone or as a plug-in to another device such as a PDA, cell phone, or remote control. The reader may further be coupled to various biometric or plug-in devices to achieve at least five levels of authentication, namely, (1) the smartcard itself; (2) the smartcard reader; (2) the PIN; (3) private-key cryptography (PKI); and (5) the (optional) biometric device. These five levels account for an extremely strong authentication applicable to public networking on public/private computers, and even on TV (satellite, cable, DVD, CD AUDIO, software applications. Transactions including payments may be carried out without any risk of communication tampering, authentication misconduct or identity theft. In essence, the device is a closed box with only two communication ports. The emulation of the device is therefore extremely complex due to the fact that it involves PKI, hardware serialization for communication and software implementation, in conjunction with a specific hardware embodiment and service usage infrastructure component that returns a response necessary for each unique transaction.

22 Claims, 10 Drawing Sheets

U.S. PATENT DOCUMENTS

| | | | |
|---|---|---|---|
| 5,825,871 A | 10/1998 | Mark | 379/355 |
| 5,905,251 A | 5/1999 | Knowles | 235/472 |
| 6,010,067 A | 1/2000 | Elbaum | 235/380 |
| 6,065,679 A | 5/2000 | Levie et al. | 235/462 |
| 6,152,371 A | 11/2000 | Schwartz et al. | 235/462 |
| 6,264,106 B1 | 7/2001 | Bridgelall | 235/462 |
| 6,397,190 B1 | 5/2002 | Goetz | 705/3 |
| 6,434,403 B1 | 8/2002 | Ausems et al. | 455/556 |
| 6,533,171 B1 | 3/2003 | Porter | 235/380 |
| 6,572,015 B1 * | 6/2003 | Norton | 235/382 |
| 6,612,488 B2 * | 9/2003 | Suzuki | 235/380 |
| 6,694,436 B1 * | 2/2004 | Audebert | 726/9 |
| 6,823,317 B1 * | 11/2004 | Ouimet et al. | 705/13 |
| 2002/0023027 A1 | 2/2002 | Simonds | 705/26 |
| 2003/0055738 A1 * | 3/2003 | Alie | 705/26 |

* cited by examiner

SMARTCARD AUTHENTICATION AND AUTHORIZATION UNIT ATTACHABLE TO A PDA, COMPUTER, CELL PHONE, OR THE LIKE

REFERENCE TO RELATED APPLICATION

This application is a continuation-in-part of U.S. patent application Ser. No. 10/215,888, filed Aug. 9, 2002, now U.S. Pat. No. 7,083,090, the entire content of which is incorporated herein by reference.

FIELD OF THE INVENTION

This invention relates generally to authentication and authorization devices and, in particular, to a portable device that can validate smartcards and other monetary instruments and requests with a high degree of transaction security.

BACKGROUND OF THE INVENTION

In the modern world of networked transaction processing, authentication is only way to validate requests for financial services and other demands with any degree of security or data integrity. However, even with the current widespread use of encryption, security codes and personal identification numbers (PINs), existing systems are subject to various types of attacks or hacking. Such security breaches may, for example, be carried out through keyboard hooks and other data-sniffing techniques, magnetic card duplicators, smartcard emulators, and so forth.

At the same, the number of electronic devices applicable to transaction and data processing has grown, including not only dedicated terminals adapted for such uses, but general-purpose computing machinery, personal and digital assistants (PDAs), laptop, palmtop and notebook computers.

Existing authentication devices are deeply connected to computers or other devices such as cable/satellite decoders to validate a particular transaction. As such, these devices represent a single point of attack for hackers who can emulate the authentication device, hook communication between the device and the software stored inside the "computer." or even record and play communication packets.

To prevent such activities, the industry is working on protocols to enable these devices to operate securely. But protocols have their own weaknesses in the sense that when they are implemented and successfully attacked, patches may become available for widespread use on internet for free.

Accordingly, the need remains for a system which would allow the use of these alternative devices, including portable devices, while, at the same time, affords a level of security which is at least as good, and preferably much higher, than systems currently in use.

SUMMARY OF THE INVENTION

The present invention resides in an autonomous and portable smartcard reader device incorporating a high level of embedded security countermeasures. In the preferred embodiment, data transfers are encrypted with two specific input devices, namely a light sensor and PIN or other keyboard entry, and at the output through the use of a dual-tone encoder-decoder. The unit may be used alone or as a plug-in to another device such as a PDA, cell phone, or remote control.

The reader may further be coupled to various biometric or plug-in devices to achieve at least five levels of authentication, namely, (1) the smartcard itself; (2) the smartcard reader; (2) the PIN; (3) private-key cryptography (PKI); and (5) the (optional) biometric device. These five levels account for an extremely strong authentication applicable to public networking on public/private computers, and even on TV (satellite, cable, DVD, CD AUDIO, software applications. Transactions including payments may be carried out without any risk of communication tampering, authentication misconduct or identity theft.

In essence, the device is a closed box with only two communication ports. The emulation of the device is therefore extremely complex due to the fact that it involves PKI, hardware serialization for communication and software implementation, in conjunction with a specific hardware embodiment and service usage infrastructure component that returns a response necessary for each unique transaction.

Another point of convenience involves the existing low-level implementation of the software necessary to work with the authentication process. With existing systems, since each occurrence of authentication requires a low-level implementation of drivers, a potential user cannot connect the device to a public computer such as a web café computer without installing the requisite drivers. According to this invention, the software necessary to validate the transaction need not be a driver or a kernel level application; as such, authentication can come from website with the usage of user level application like and not limited to java, activex, or other languages.

As an alternative to the use of a separate or independent display (CRT or LCD) and keyboard, a plug-in unit may be used. The device is essentially a handset including a smartcard reader, preferably with two (2) biometric sensors, one for the voice and the other one for the fingerprint. When the handset is attached, the associated PDA or phone keyboard sends DTMF signals which are recognized by the device. PDA or phone screen can be updated thru a WAP application link to a vocal server.

In the preferred configuration of this embodiment, the biometric handset includes a (cryptographic) processor to perform elliptic curves and random number generator. A dedicated ASIC/DSP sends and receives the DTMF/FSK signals. In addition to other advantages, the system can deliver a vocal instruction to the handset. The device is battery operated with a backup. Other features include an atomic time clock and software that can be updated by way of a smartcard javacard or DTMF/FSK. The amount of memory is optional. Policy considerations may also be stored on the smartcard.

DETAILED DESCRIPTION OF THE INVENTION

Figure 1:
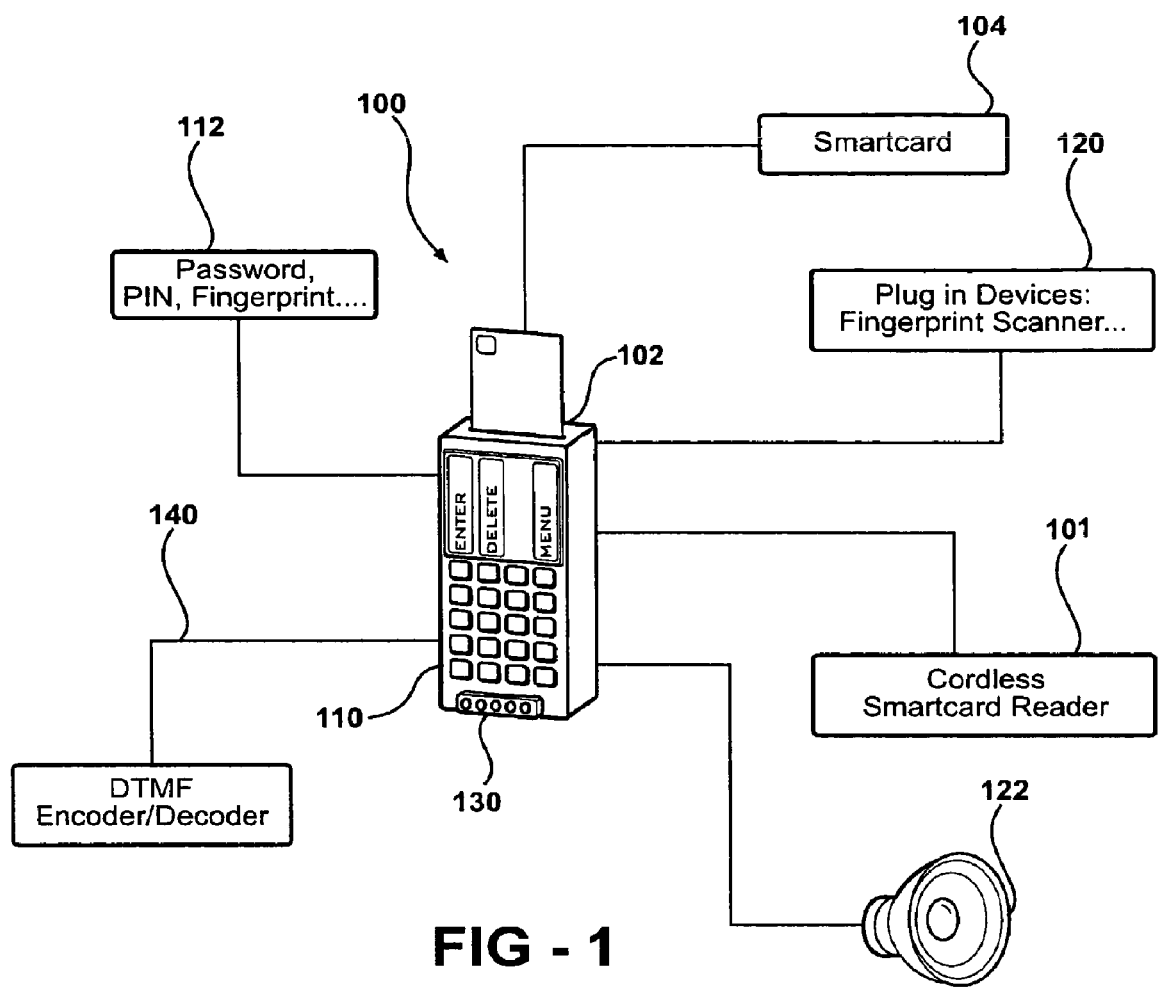
FIG. 1 is a drawing of a portable smartcard device reader according to the invention.

Now making reference to the drawings, FIG. 1 illustrates the preferred embodiment of the invention in the form of a portable device 100, with a smartcard reader indicated generally at 101. The device includes slot(s) 102 to receive the card 104, and a keyboard 110 enabling passwords, personal identification numbers, and the like to be input by a user. It will be appreciated that although a generic "smartcard" is shown in the figure, in the preferred embodiment, the unit includes its own central-processing unit for transaction management and input/output capability for reading and writing information to various other types of cards including magnetic cards, optical cards, EAROM cards, random-access memory (RAM) cards, and read-on memory (ROM) cards. Nor is the unit limited to the use of a single type of smartcard or other card, since in alternative embodiments, the same unit may recognize multiple card owners and users.

An interface 120 may be provided for connection to a plug-in type of biometric device such as a fingerprint scanner or other input. Optionally, in the alternative, such plug-in devices may be integrated directly into the apparatus 100. Indeed, although speaker 122 is shown as being remote from the body of the unit, in the preferred embodiment the speaker is integral.

Further included in the device 100 is a light sensor 130, described in further detail below, and an output 140 to deliver an encoded signal associated with authentication. As shown in the figure, in the preferred embodiment, the signal is a dual-tone, multi-format (DTMF) signal.

As discussed elsewhere herein, the device incorporates numerous mechanisms to ensure the highest degree of security against hacking and other forms of security attacks. For example, in the preferred embodiment, the device is deactivated in the event that an incorrect PIN number is entered more than a predetermined number of times, which may be adjustable from one instance or more. The system is also preferably capable of sensing and guarding against physical and other forms of corruption, including sensors which detect forces sufficient to break the device or other forms of misconduct.

Other optional capabilities to guard against intrusion include mechanical for preventing the extraction of the card if the PIN/password, fingerprint or other authorization does not correspond to the authorized user. As a further optional, in the event of these other attempts to gain unauthorized access to the unit or components thereof, data stored within the device, whether volatile, or read-only, as well as smartcard or other types of card information may automatically be erased.

In addition to authentication codes and other information associate with a particular instance or transactions, the unit may be equipped with sufficient memory capability to additionally store other types of information, including personal data of the owner of the unit and/or card, including, but not limited to, address, billing address, zip code, social security number, e-mails, web addresses, and so forth.

Given the extent to which certain user information is compiled and stored by the device, an optional feature is the ability to permit new users, as well as the deactivation of other users based upon the receipt of appropriate commands. The activities of particular users may also be stored and time-stamped, for later readout, either directly through the device or by way of remote access.

The reader may also be automatically updated through the use of codes received on a periodic or occasional example, for example, at the time of each transaction. Such auto-update capabilities may be encrypted with a counter, for example, used to verify reader research, or otherwise used to update algorithms or data stored in memory. As opposed to electrical or wireless remote updates, such information may be received optically or through the use of known or future standard protocols such as bluetooth technology and the like.

Figure 2:
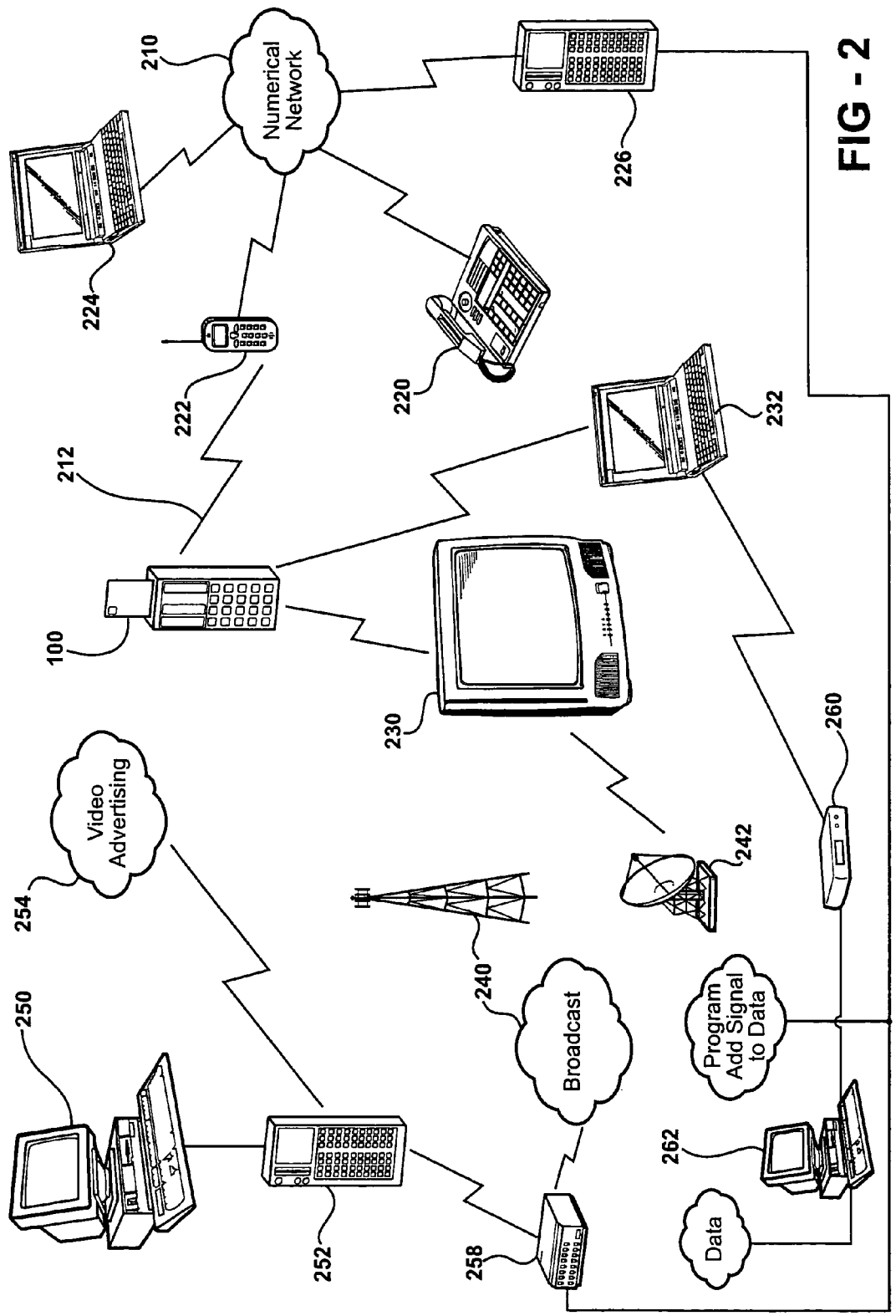
FIG. 2 is a drawing which illustrates important aspects of an infrastructure to which the device of FIG. 1 is applicable.

FIG. 2 is a diagram which illustrates the various environments in which the device 100 operates. Broadly, the system is able to generate a request for an authentication through a wide variety of devices, and receive verification through numerous other diverse types as well. In FIG. 2, any device capable of connection to telecommunications infrastructure 210 may receive a request for authentication since, in the preferred embodiment, such requests are generated utilizing the well established dual tone multi-frequency (DTFM) encoder/decoder signal 212. Such devices would include, standard wire telephone 220, cellular telephone 222, any network computer 224 or a numericast network 226 operated to collect and aggregate viewer payments, for example.

In terms of the authentication signal, any television 230 or network computer 232 may participate. Television 230 may, in turn, receive input from any applicable transmission medium, including broadcast 240, satellite 242, and so forth. Equipment originating the information may be derived from a workstation 250 or any other wired or wireless computing device. A network and advertising module 252 may be used to integrated video advertising 254, to add the light signal sensed by sensor 130 of the device 100. The unit 258 may be used to integrate the light signal to broadcast on vertical blanking, MPEG or other protocols to television or monitor 230. Indeed, through the use of a connection between the numericast network device 226 and module 258, a programming signal may be added to the broadcast verification signal, resulting in a comprehensive data feedback loop.

With respect to computer 232, any device capable of connection to the internet 260 or other infrastructure may be used. Devices such as 262 connected to the internet 260 may include the appropriate data enabling the verification signal to be routed from point-to-point, ultimately leading to verification at device 100.

The device 100, though shown as an independent unit, may be integrated to any form of existing device, be it a personal digital assistant (PDA), cellular telephone, or even hand-held remote control. In some of these applications, including the remote control, an additional light sensor may not be necessary, since information used to authenticate may already be provided in the form of an existing infrared module associated with any one of a variety of entertainment devices (TV, VCR, tape, DVD, CD audio). In these cases, the additional hardware required by the invention would include the DTMF encoder/decoder, and smartcard reader to permit the acknowledgement of a transaction.

The data entered into the device 100 may be encrypted or non-encrypted when received. If an encryption mechanism is used, it may be of any type, including public or private key. For example, the name, social security number, or other type of information may be used, depending upon the level of security needed, a technique known as identity-based encryption (IBE).

As discussed above, the authentication data may be delivered through any type of computer monitor, television, liquid-crystal display (LCD), light-emitting diode or other emitter, operative to generate a high-contrast signal to be received and interpreted by the device 100. Software application would used to generate signals which are transcoded from an analog or other format into a binary, hexadecimal or other digital scheme to enhance reception.

In conjunction with the received optical signal, the processor and device 100 preferably further requests additional authentication data through some form of user interface, including the keypad (personal identification number or PIN), biometric authentication, such as a fingerprint, or other applicable security mechanism.

Once received and stored in internal or external memory, the information is appropriately decrypted and/or re-encrypted, and sent to any external device (microphone, standard telephone, cellular phone, and so forth) as a dual-tone (DTMF, AFSK, or PL) signal for transactional purposes.

The device 100 may operate independently, or as discussed above, may be added a plug-in to an existing device such as a PDA, phone computer, cellular phone, remote control television, keyless entry system, and so forth. Broadly, the interface device coupled to an optoelectronic device incorporating a smartcard reader for the acquisition of optical messages, and a dual-tone multi-decoder (DTMF, AFSK, PL) to send back authentication information, including payment validation, authorization, key opening or other operations.

Figure 3:
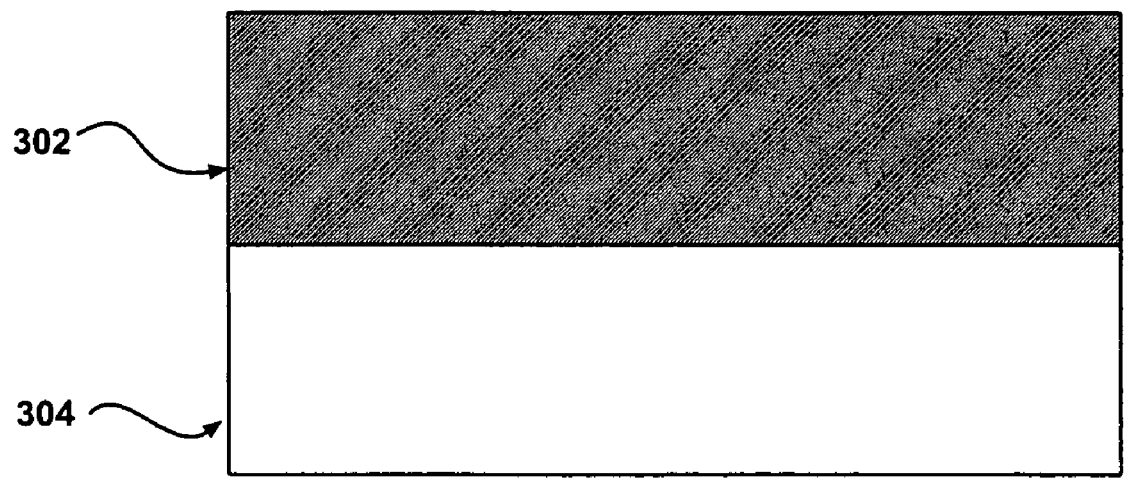
FIG. 3 is a drawing which shows a preferred optical signal according to the invention associated with the an authentication procedure.

Now making reference to FIG. 3, the preferred embodiment uses a high-contrast black and white image (or any other appropriate color or high-contrast arrangement from an LED, flashing LCD screen, or highly pixelized optical signal). For example, a screen may be used, wherein for example, a black upper signal 302 becomes white, while the black signal 304 becomes black, with the timeframe between the two signals establishing a parity or check sum. In the device 100, an electronic scanning sensor is used including optics which permit the recognition of the black and white images (or other appropriate signal), enabling the smartcard reader data to become available for authentication purposes.

The optics used to interpret the signal may be of various forms, including the use of two lenses interposed between an outer diaphragm and a sensor. For example, the lenses may use a revolving symmetrical lens, which the useful part of which is convex, in conjunction with a cylindrical lens which does not create any deflection in a plane parallel to the optical plane. Instead, the optical input is convergent in a plane perpendicular to the parallel plane once received, facilitating translation into numeric, hexadecimal, binary or other digital signaling.

After the smartcard and/or reader performs appropriate public key authentications and validation of digital signature, the encrypted data is sent back to the DTMF encoder/decoder, enabling the phone, computing device or other unit to validate the authentication transaction. In terms of security, each transaction uses its own encrypted counter with signals that are different to prevent recording thanks to the usage of atomic clock component at the synchronization level. Within the reader 101, the software is preferably stored in an obfuscated manner, with each module being preferably software encrypted and decrypted and re-encrypted after usage using a unique process, with new sessions keys being transmitted to prevent disassembly or decompilation of the software or portions thereof. Sensors within the unit may be used to detect excessive use of heat or power, representing some form of misconduct which would be reported during the next transaction with all information needed to prevent further usage.

The device 100 preferably includes its own liquid crystal display, facilitating the readout of certain information, such as authorization numbers, payment authorization, serialization, or data regarding check payment or Visa/MasterCard/American Express authorization numbers. Such information would be linked to an amount of purchase or details on an item order and paid once the bank has issued an authorization on the transaction.

Figure 4A:
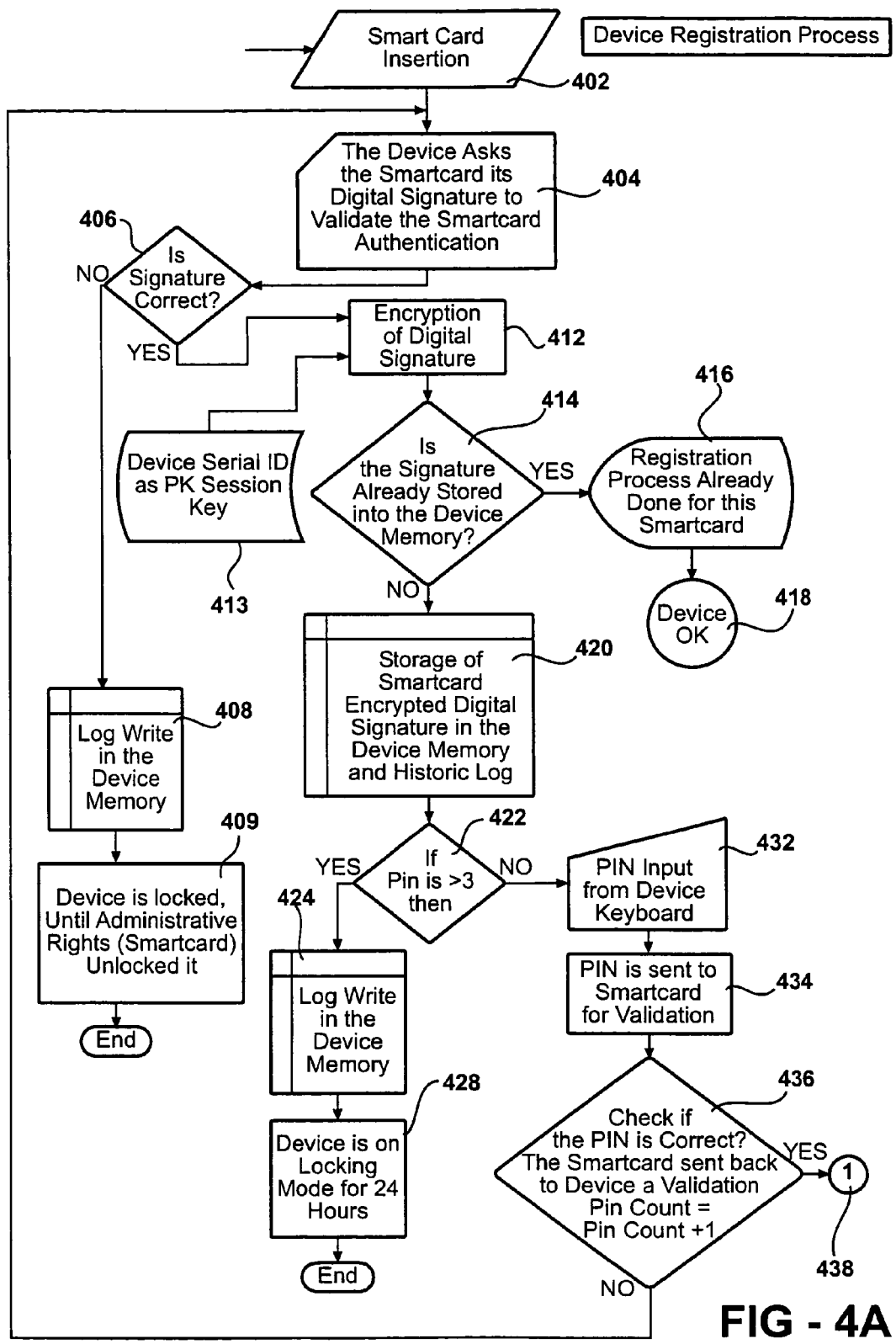
FIG. 4A is a flow diagram showing the first portion of a preferred device registration process according to the invention.
Figure 4B:
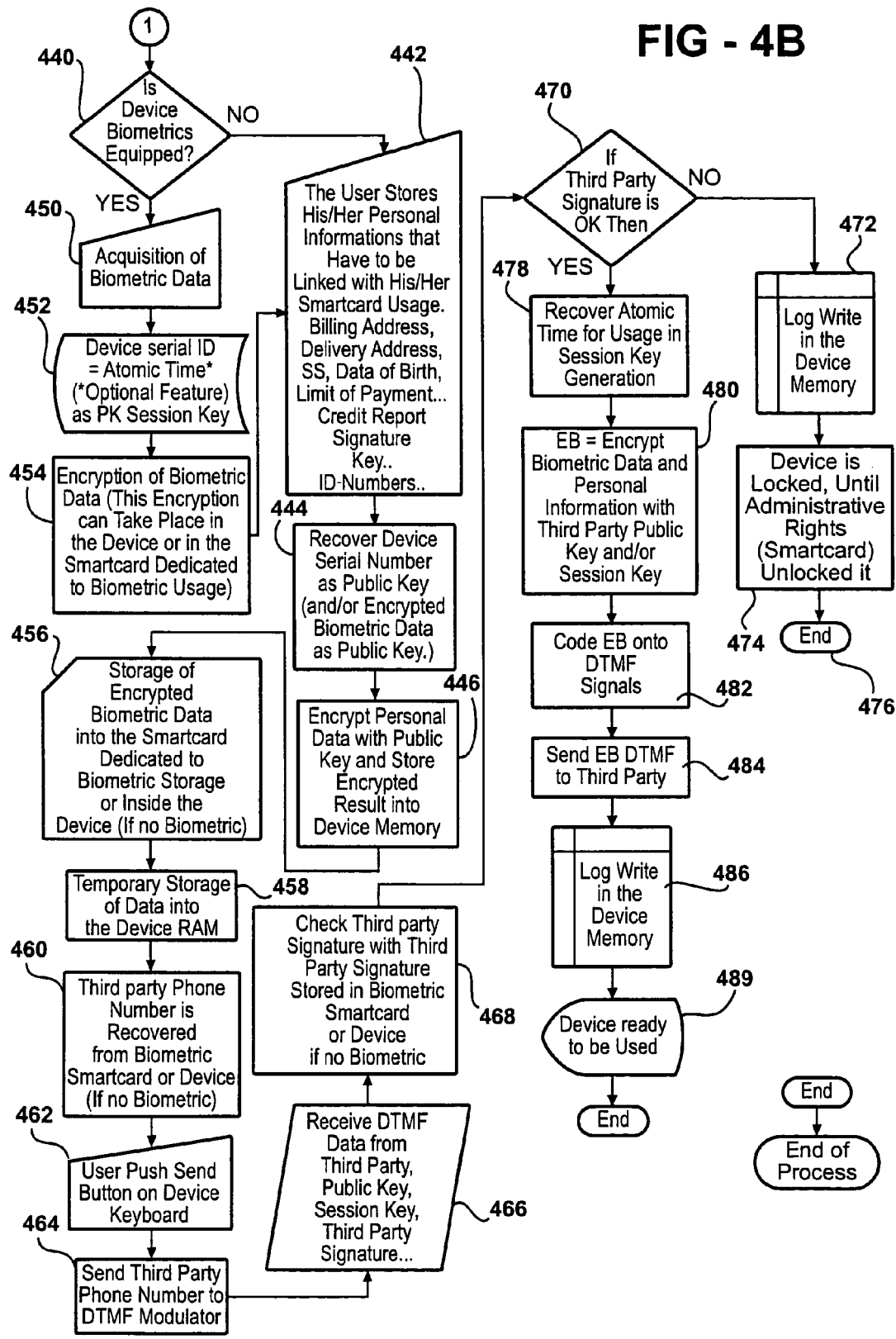
FIG. 4B is a flow diagram which illustrates the remaining portion of the preferred device registration process.

FIG. 4A is a flow diagram showing the first portion of a preferred device registration process according to the invention. FIG. 4B is a flow diagram which illustrates the remaining portion of the preferred device registration process. The procedure commences with the insertion of the smartcard at 402. At block 404, the device interrogates the smartcard, comparing the digital signature in order to validate the authentication procedure. If the signature is correct, block 406, encryption of the digital signature proceeds at block 412. If the signature is not correct, an entry is made into the device memory at 408, and, in the preferred embodiment, the device is frozen in terms of operation until an authorized user unlocks the device at 409, and the process ends at 410.

The encryption of the digital signature at block 412 preferably uses the device's serial identification/session key derived at block 413. At block 414, a query is made to determine if the signature has previously been stored in the device memory. If it has, the registration process has already been completed for this smartcard (block 416), and the device is authenticated at 418. If, however, the signature has not been previously been stored, storage of an encrypted digital signature into the device memory history log occurs at 420.

At block 422, a query is made to determine how many times the personal identification number (PIN) has been entered into the device. If, in this example, it is greater than three, an entry is made into the device memory at 424, and the device is locked out for a predetermined period of time, such as 24 hours, the process ends at 430. If fewer attempted PINs have been entered, a PIN is entered from the keyboard at 432 sent to the smartcard for validation at 434. A test is made at 436 to determine if the PIN is correct. If it is not, the process essentially starts over. If the PIN is correct, however, query is made at 440 to determine if the device is biometrics equipped. If so, the biometric data are acquired at block 450. If not, the user stores personal information that will be linked to smartcard usage at block 442. The device serial number is recovered at 444, either as a public key and/or encrypted biometric data in the form of a public key. At 446, the encrypted personal data and public key are stored in the device memory.

At block 452, having acquired biometric data at 450, the device serial ID and optional atomic time are used as a session key. At block 454 the biometric data are encrypted. This encryption may occur in the device or in a smartcard dedicated to biometric usage, and process passes to block 442. The storage of the encrypted biometric data into the smartcard occurs at block 456. This may occur as permanent storage in some form of non-volatile memory or, alternatively, temporary storage may be transferred into random-access memory (RAM), at 458.

Optionally, a third-party phone number may be recovered from the smartcard if, for example, biometric data is unavailable. At 462, the user pushes the SEND button on the device keyboard, causing a third party number to be sent via DTMF modulation or the other schemes disclosed herein. The DTMF data is received from the third party, along with public key session and other information at 466. At block 468, the third party signature is compared to the third party signature or biometric information stored on the card. At 470, a check is made to determine whether the third party signature is authentic. If not, an entry is logged into the memory of the device at 472, and the device is locked until administrative personnel are called upon to unlock it. The process ends at 476.

At block 478, atomic time is recovered for usage in session key generation. At 480, the biometric and/or personal information with third-party public key and/or session key are encrypted at 480 (EB), and the encoded EB information is transmitted via DTMF or other appropriate signaling at 482. In particular, at 484, the EB is transmitted to a third-party, with a log being entered into the device memory. This completes the registration process, with the device being ready to use at 488, and terminating at 490.

Figure 5A:
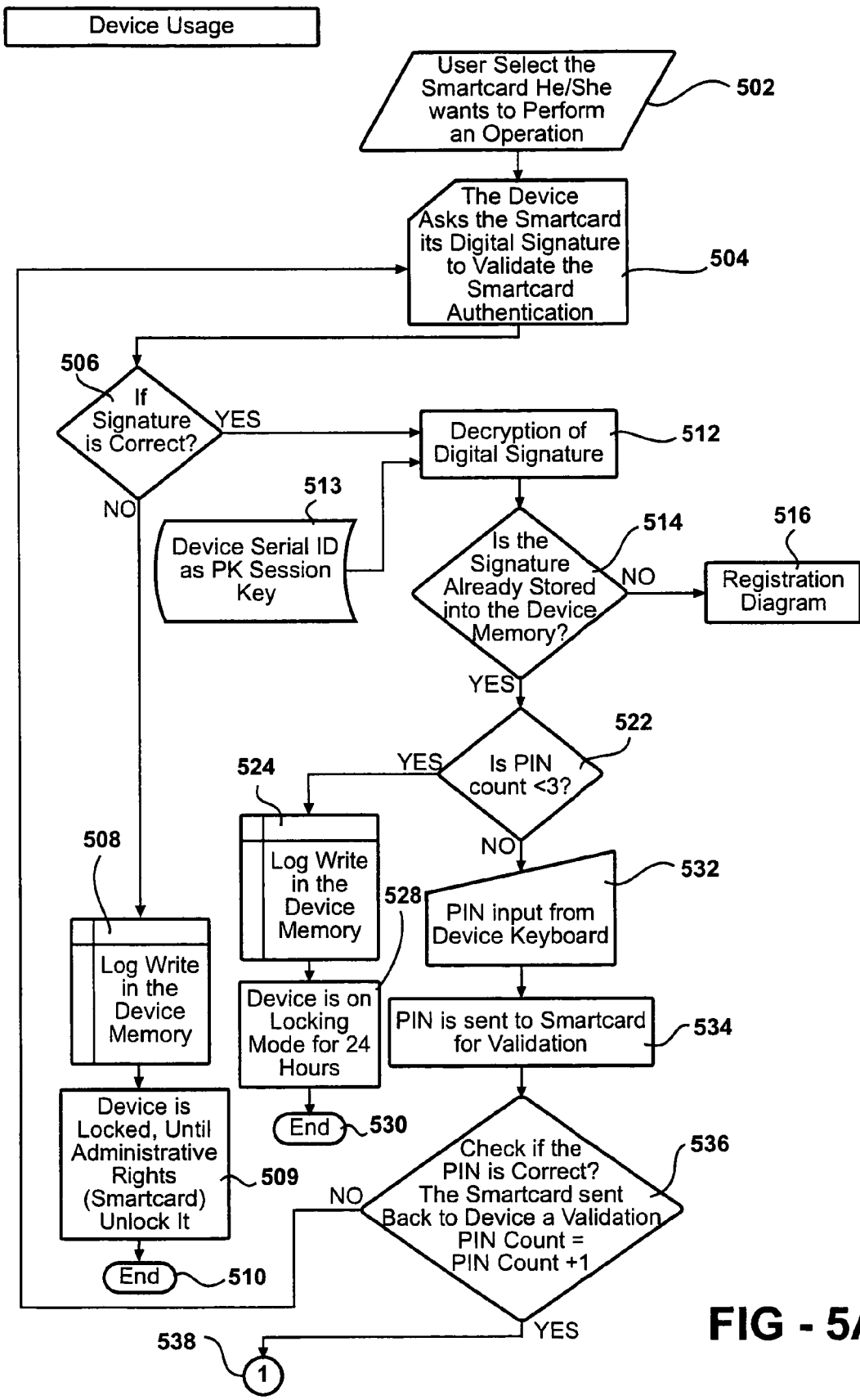
FIG. 5A is the first party of a flow diagram used to illustrate the preferred way in the device is used according to the invention.
Figure 5B:
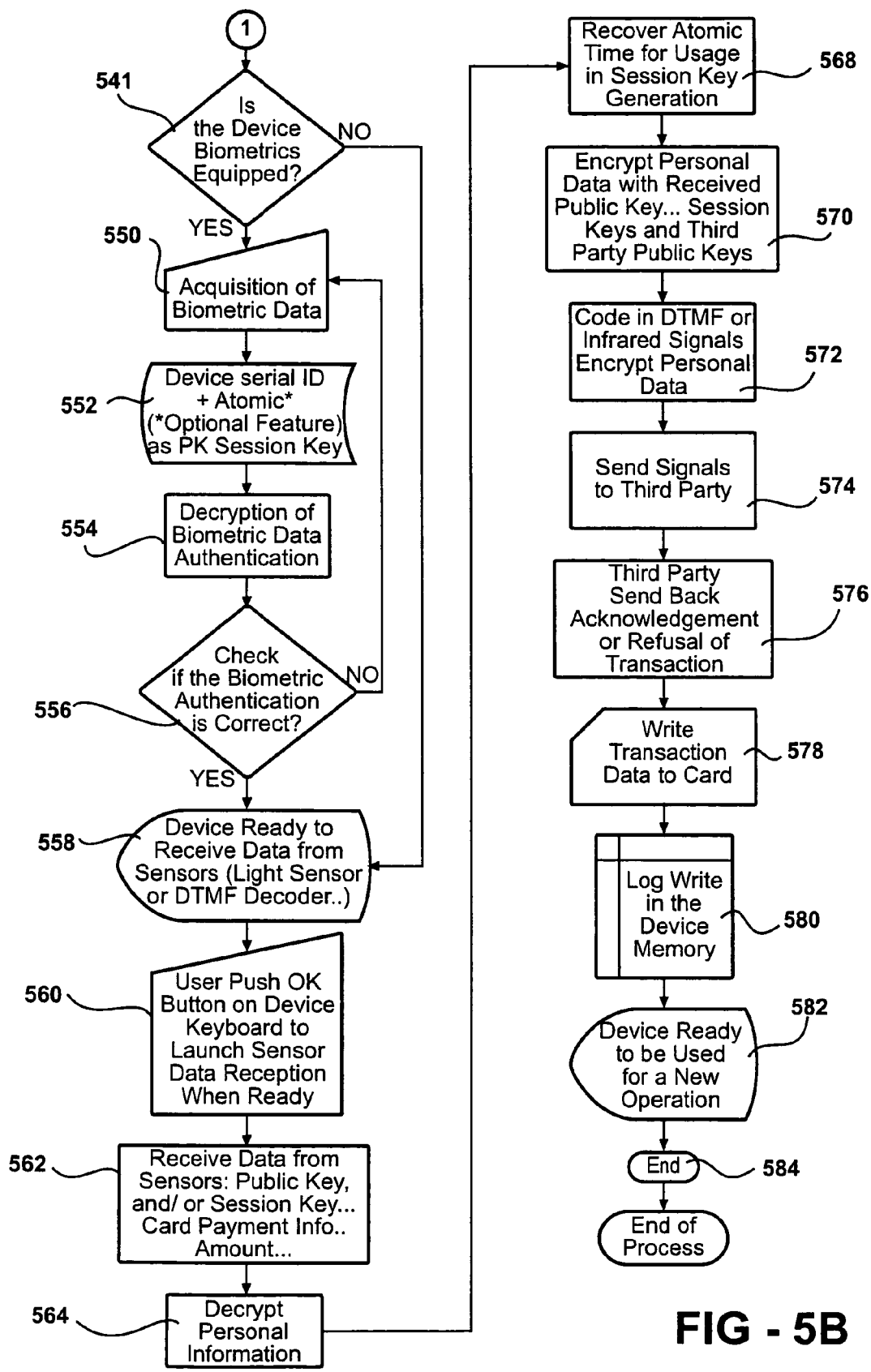
FIG. 5B is a flow diagram illustrating the remaining functional steps of the usage process.

FIG. 5A is the first party of a flow diagram used to illustrate the preferred way in the device is used according to the invention. FIG. 5B is a flow diagram illustrating the remaining functional steps of the usage process. The sequence begins at 502, with a user selecting the smartcard intended for use. At 504, an interrogation is made by the device to determine whether the digital signature is valid to permit authentication. If the signature is correct, at 506, encryption of the digital signature occurs at 512 using the device serial ID as a session key (513). If the signature is not correct, an entry log is made into the memory of the device at 508, and the device is locked until administrative personnel unlock the device, and the process terminates at 510.

At 514, a query is made to determine if the encrypted signature is already stored in the memory of the device. If not, control passes to block 516, awaiting the registration process described with reference to FIGS. 4A and 4B. If the signature has been stored, and the temp set PIN entry are sufficiently low at 522 a PIN is received from the keyboard at 532. If the number of PIN entries is too high, however, a log is made in the memory of the device at 524, an operation is locked for a determined period of time such as 24 hours at 528 and the process ends at 530.

Once the PIN is input from the keyboard at 532, it is sent to the smartcard for verification at 534. At 536, a check is made to determine whether a PIN is made. If not, the process essentially starts over at block 504. If the PIN is correct, however, control passes to point 538 and onto block 540 where a test is made to determine whether the device is biometrics equipped. If so, the biometrics data are acquired at 550. Optionally, at 552, the device serial ID and atomic time are used as a session key. The biometric data are decrypted at 554, and a test is made at 556 to determine whether the authentication should proceed based upon the decrypted biometric data. If not, the control resumes at 550 with the acquisition of further biometric data, as necessary.

If the biometric data are valid, however, the device is ready to receive data from the light sensor or DTMF decoder at 558. The user initiates the process using the keyboard on the device at 560 to accept sensor data when ready. At 562, the data is received from the sensors, public key and/or session key, including the card information, payment terms, amount of transaction, and so forth.

At 564, personal identification is decrypted and atomic time is recovered at 566 for usage in generating a session key. Personal data are encrypted when received at 570, along with public key, session keys, and third-party public keys. At 572, a code in DTMF of infrared signals is used to encrypt the personal data which is sent to the third-party at 574. The third-party sends back an acknowledgement or refusal of the transaction at 576 and the transaction is recorded on the smartcard 578. A log is made in the memory of the device at 580, and the device is ready for use in a new operation at 582. The session terminates at 584.

Figure 6A:
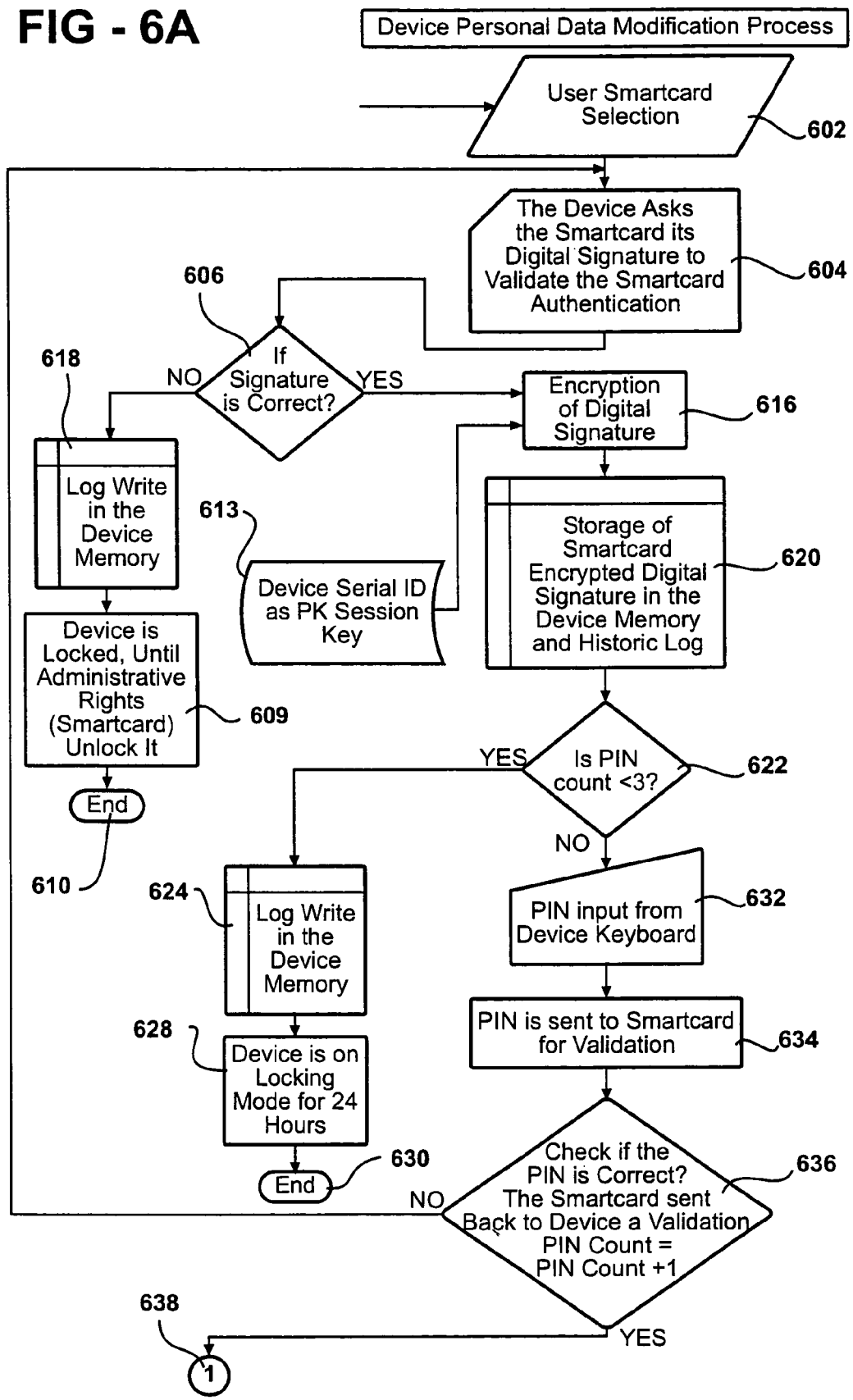
FIG. 6A is a flow diagram which illustrates a preferred process associated with personal data modification utilizing the device according to the invention.
Figure 6B:
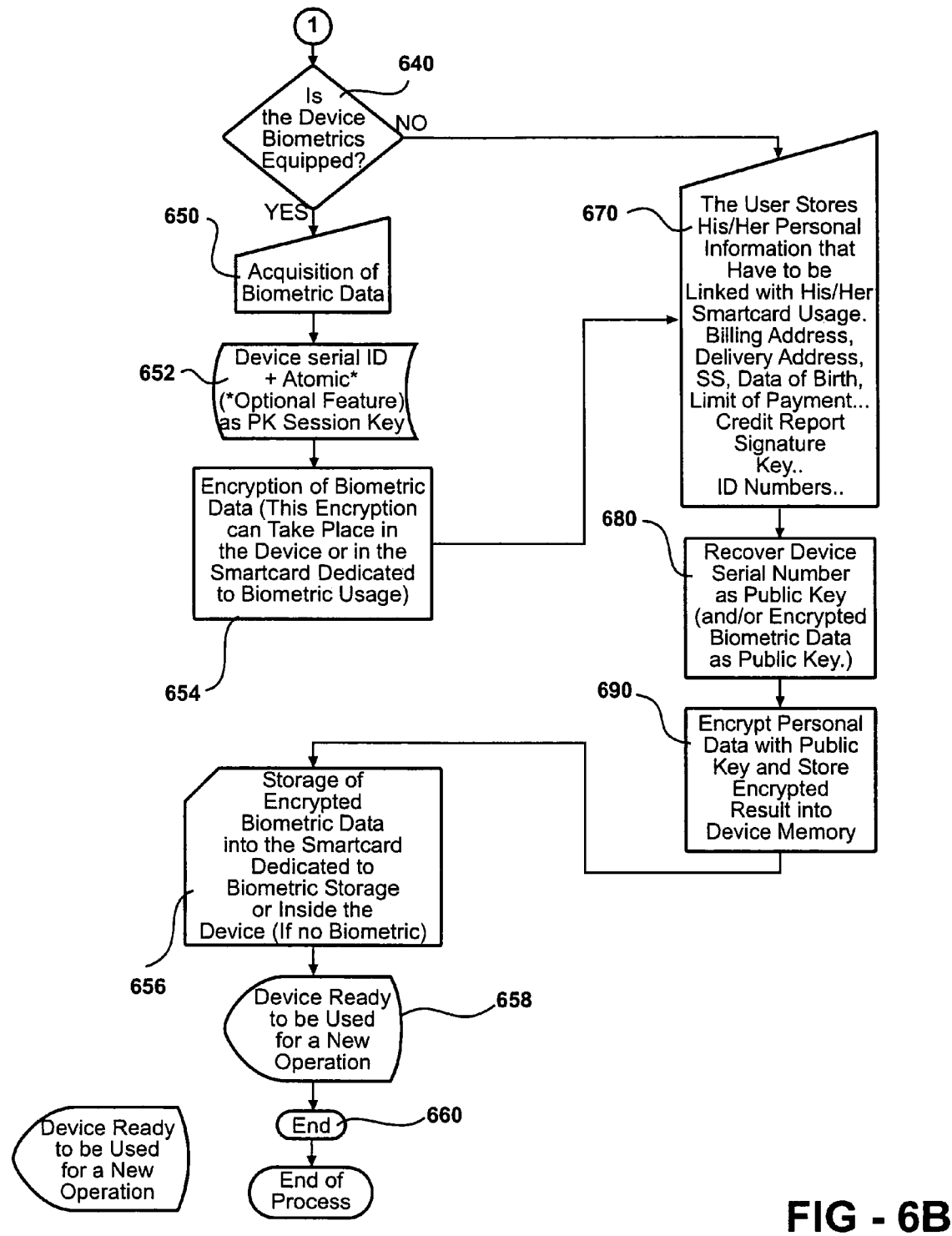
FIG. 6B is a flow diagram which continues the personal data modification process according to the invention.

FIG. 6A is a flow diagram which illustrates a preferred process associated with personal data modification utilizing the device according to the invention. The modification process continues in the flowchart of FIG. 6B. The process begins at 602 with the user selection of the smartcard. At 604, the device interrogates the smartcard digital signature to validate authentication (604). If the signature is correct (606), encryption of the digital signature occurs at 616, with the device serial ID being used to generate a session key (613). If the signature is not correct, however, an entry is logged in the memory of the device at 608, and the device is locked until administrative personnel are called upon to unlock it at 609, and the process terminates at 610.

Assuming the digital signature has passed through encryption at 616, storage of the smartcard encrypted digital signature in the device and history log occurs at 620. At 622, it is asked whether the personal identification number (PIN) has only been attempted once or a few number of times. If entry is attempted more than a predetermined number of times, such as three or more, a log is made in the device at 624 and it is locked for a predetermined period of time, such as 24 hours at 628. The process terminates at 630. If only one or a few attempts have been made at PIN entry, the pin is entered from the keyboard at 632, and sent to the smartcard for validation at 634. At 636, a test is made to determine if the PIN is correct. If not, the above process essentially repeats, with control being returned to block 604. Assuming, however, the correct pin has been entered, the question is asked at 640 as to whether the device is biometrics equipped. If so, the biometric data are acquired at 650. If not, the user may store personal identification which will be linked to smartcard usage, including billing address, delivery address, social security, date of birth, limit of payment, credit report, signature, and so forth at 670. The device recovers the serial number for use in generating a public key (and/or encrypted biometric data) at 680. At 690, the personal data are encrypted along with public key information, and the result is stored into the memory of the device.

The encrypted biometric data are also stored in the smartcard and/or inside the device if no biometric data are available at 656. At 658, the device is ready to be used for a new operation, and the process ends at 660.

The invention is not limited in terms of usage, and is therefore applicable to at least the following types of transactions:

ID including passports; Identity cards; medical, corporate, and social security, electronic vote based on smartcard technology, TV satellite, cable ordering, payment, any media (TV, computer, DVD, VHS, streaming video, or audio . . . ) advertising payments, internet transactions and authentications, computer authentication and transactions, specific Web application that need authentication (email authentication, or bank authentication transaction), authentication based on data usage or rules (policy) (copyrighted material music, DVD, files, movies, streaming . . . ), public and/or private utilities services such as telephone invoicing, electricity invoicing, water invoicing, gas invoicing, retail outlet gas stations, security authentication access (governmental institutions . . . ), hotel industry, entertainment including movies theatres, music/music events, entertainment parks, private and/or gated community, airlines industry (airplane ticket), highway toll, healthcare industry, parking payment. car rental, rental, metro ticket, door opener (home, car), physical security, home security, car security, Payment in physical retail location, ATM cash transaction, (in this case the ATM machine does not need to have any keyboard . . . ), software applications or games usage authentication, OS usage authentication, lotto, or gaming (casino . . . ) applications based on the payment and the storage of possible personal data, payment on automated machine such as beverage/candy/food machine, Prepaid debit/credit card for micro payment, The use of a debit/credit card as a phone card, In addition, the device may further be interconnected to existing accounting software, to memorize the history of card usage and send detailed and itemized balance on all payment collected via software or by phone.

This device can also return funds to the smartcard holder and notify the bank. This device permit also cache authorization storage based on preapproved amount link to the amount allowing users, to make multiple purchase based on one single authorization number. Providing full payment guaranteed to the merchant. This device will allow multiple credit card issuers, and will handle multiple authorization as well. It further permits complete decentralization of credit report, allowing the device to maintain his/her own credit report.

Figure 7:
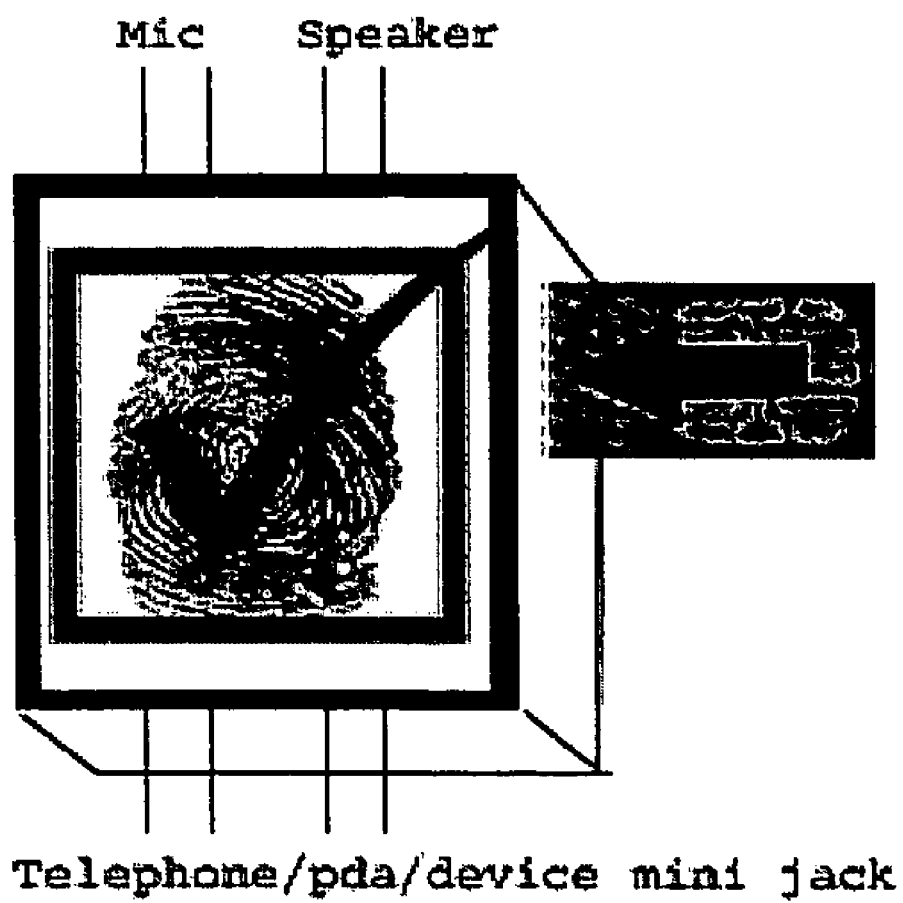
FIG. 7 is a drawing of a card reader attachable to a PDA, portable phone or other device, including one or more biometric inputs.

As an alternative to the use of a separate or independent display (CRT or LCD) and keyboard, the plug-in of FIG. 7 may be used. The device is essentially a handset including a smartcard reader, preferably with 2 biometric sensors, one for the voice and the other one for the fingerprint. This is a highly secured device, including a timestamped Private Key that is generally locally and linked to the biometric information. The smartcard used may be a payment card or any service card (i.e., SIM or 7816 size). Up to 5 or more smartcard may be read simultaneously.

In the preferred configuration of this embodiment, the biometric handset includes a (cryptographic) processor to perform elliptic curves and random number generator. A dedicated ASIC/DSP sends and receives the DTMF/FSK signals. In addition to other advantages, the system can deliver a vocal instruction to the handset and receive the voice as a second biometric identification from the microphone of the headset. The device is battery operated with a backup. Other features include an atomic time clock and software that can be updated by way of a smartcard (SIM or 7816 size) javacard or DTMF/FSK. The amount of memory is optional. Policy (in encrypted XML) considerations may also be stored on the smartcard.

When the handset is attached, the associated PDA, computer, or phone keyboard sends DTMF signals which are recognized by the device. PDA or phone screen can be updated thru a WAP application link to a vocal server.

This system takes advantage of Identity-based Encryption (IBE) utilizing biometric usage and timestamping technology. At least four algorithms may be used.

1. Setup

A user, "Bob," generates sys-params and master key. To initialize an IBE security, a key generator picks an elliptic curve, a secret S and a point P on the curve using a random number generator. The secret S is the biometric data so nothing can compromise the system.

2. Encrypt

The sender, Alice, during handshaking receive from bob the public parameters, P and S●P, (the product of bob's S and P), Bob's identity (this might, for example, be the "phone number"+T where T is the key expiration).

Alice, to encrypt a message to Bob, first hashes Bob's identity to a point on the elliptic curve IDBob. She then picks a random r and calculates a key k where k=Pair (R●IDBob, S●P)

Alice then sends to Bob Ek[Message], the message encrypted with k. She also sends him the product R●P.

3. Key Generation

When Bob receives the message, retrieve s from bob biometric data, recover and compare T locally (key expiration stored during handshaking) and calculates S●IDBob and this value is his private key.

4. Decrypt

After receiving the message and a key, Bob can recover the key k by calculating:

$$k=\text{Pair}(S\bullet IDBob, R\bullet P)$$

which, because of the properties of bilinear maps, is the same as the key Alice used to encrypt the message:

$$k=\text{Pair}(R\bullet IDBob, S\bullet P)$$

Using k, Bob decrypts the message. As Bob is the only person with this private key (biometric), S●IDBob, no one else can calculate k. T=key expiration calculated from the (atomic) timestamped clock

I claim:

1. A method of authenticating a transaction, the method comprising:

causing a separate unit to communicate with a device, the separate unit being secured and independently operating from the device, the separate unit configurable to include a biometric sensor to obtain biometric characteristics of a user, the biometric characteristics physically representing the user;

initiating a local authentication process using the separate unit, the local authentication process comprising:

obtaining the biometric characteristics of the user from the biometric sensor;

decrypting stored biometric characteristics for the user; and comparing the biometric characteristics with the stored biometric characteristics;

if the biometric characteristics match with the stored biometric characteristics, initiating an encrypted authentication transaction request comprising:

receiving personalized data at the device from the user;

recovering atomic time for usage in session key generation;

encrypting the personalized data using the sessions keys, public keys and third party public keys; and sending the encrypted personalized data to the third party through the device as encrypted authentication transaction request using a challenge response protocol method, wherein the atomic time is used as a serialization and challenge response protocol variable;

receiving a signal at the separate unit signing the encrypted authenticated transaction request via the device to authenticate the transaction; and digitally signing the authentication at the separate unit using the atomic time clock stamping of the transaction between the device and the third party.

2. The method of claim 1, wherein the separate unit is further configurable to include a second biometric sensor to acquire second biometric characteristics of the user to ensure that the user is indeed authenticated.

3. The method of claim 1, wherein the first biometric sensor is a fingerprint sensor to acquire a fingerprint of the user, and the second biometric sensor is a microphone to acquire a voice of the user.

4. The method of claim 1, wherein the device is a personal digital assistant (PDA).

5. The method of claim 1, wherein the device is a telephone.

6. The method of claim 5, wherein the telephone is a cellular telephone.

7. The method of claim 1, wherein the signal used to authenticate the transaction is a high-contrast signal.

8. The method of claim 1, wherein said communicating the transaction request to the third party involves a use of a dual tone audio signal.

9. The method of claim 8, wherein the signal is an audio frequency shift keying (AFSK) signal.

10. The method of claim 8, wherein the signal is a private line (PL) signal or a wireless signal.

11. The method of claim 1, wherein the signal is an audio frequency shift keying (AFSK) signal.

12. The method of claim 1, wherein said initiating a transaction request includes an entry of a personal identification number (PIN) through the keyboard of the device.

13. The method of claim 12, wherein the separate unit is terminated if a PIN entry is attempted more than a predetermined number of times.

14. The method of claim 1, wherein the separate unit further includes a biometric input; and said initiating a transaction request includes receiving biometric data through the biometric input.

15. The method of claim 14, wherein the biometric input is a fingerprinting.

16. The method of claim 1, wherein one or both of the transaction request and the authentication signal are encrypted.

17. The method of claim 16, wherein the encryption is based on public key cryptography further including and not limited to Identity-Based Encryption (IBE).

18. The method of claim 1, wherein the separate unit or device includes a memory; the transaction request and authentication signal constitute a session; and information regarding the session is stored in the memory.

19. The method of claim 1, wherein the separate unit is a headset.

20. The method of claim 19, wherein the headset includes capability of reading in confidential information from a user associated with the device.

21. The method of claim 1, wherein the said encryption is performed using a one-way encryption algorithm that employs one or many biometric input, atomic clock and unique session keys.

22. The method of claim 1, wherein the said authentication is performed using a challenge response protocol.

* * * * *